US007142674B2

(12) United States Patent
Brickell

(10) Patent No.: US 7,142,674 B2
(45) Date of Patent: Nov. 28, 2006

(54) METHOD OF CONFIRMING A SECURE KEY EXCHANGE

(75) Inventor: Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 937 days.

(21) Appl. No.: 10/177,626

(22) Filed: Jun. 18, 2002

(65) Prior Publication Data

US 2003/0233550 A1    Dec. 18, 2003

(51) Int. Cl.
*H04L 9/00* (2006.01)
(52) U.S. Cl. .......................................... 380/44; 380/285
(58) Field of Classification Search ................ 380/44, 380/277, 283, 285
See application file for complete search history.

(56) References Cited

U.S. PATENT DOCUMENTS

| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya et al. |

(Continued)

FOREIGN PATENT DOCUMENTS

DE        42 17 444 A1     12/1992

(Continued)

OTHER PUBLICATIONS

B. Schneier, "Applied Cryptography, Communications Using Symmetric Cryptography," Applied Cryptography: Protocols, Algorithms, and Source Code in C, Oct. 1995, pp. 28-33, 176-177, pp. 216-217, 461-473, 518-522, 2nd Edition, XP-002251738, John Wiley & Sons, New York, NY, USA.

(Continued)

*Primary Examiner*—Emmanuel L. Moise
*Assistant Examiner*—Jeffrey D. Popham
(74) *Attorney, Agent, or Firm*—Steven P. Skabrat

(57) ABSTRACT

A key exchange protocol can be performed between components of a system, such as between a computer program being executed by the processor of a PC (or other computer system) and a peripheral. A peripheral with a user input capability and a very limited display capability, such as a keyboard or a mouse, may be used to confirm a key exchange between the system components in a way that requires the user to enter only small amounts of input data (e.g., keystrokes or mouse clicks). Security between components may be enhanced without having a negative impact on usability of the system. Embodiments of the present invention help to deter "man in the middle" attacks wherein an attacker gains control of a system component situated between certain communicating system components.

29 Claims, 6 Drawing Sheets

U.S. PATENT DOCUMENTS

| | | |
|---|---|---|
| 4,825,052 A | 4/1989 | Chemin et al. |
| 4,907,270 A | 3/1990 | Hazard |
| 4,907,272 A | 3/1990 | Hazard et al. |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,345,506 A | 9/1994 | Tsubakiyama et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,440,635 A | 8/1995 | Bellovin et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal et al. |
| 5,901,225 A | 5/1999 | Ireton et al. |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo et al. |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,122,736 A | 9/2000 | Vanstone et al. |
| 6,125,430 A | 9/2000 | Noel et al. |
| 6,131,166 A | 10/2000 | Wong-Insley |
| 6,148,379 A | 11/2000 | Schimmel |
| 6,151,676 A * | 11/2000 | Cuccia et al. ............... 713/176 |
| 6,158,546 A | 12/2000 | Hanson et al. |
| 6,173,400 B1 | 1/2001 | Perlman et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery |
| 6,314,409 B1 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams et al. |

| | | |
|---|---|---|
| 6,374,286 B1 | 4/2002 | Gee et al. |
| 6,374,317 B1 | 4/2002 | Ajanovic et al. |
| 6,378,068 B1 | 4/2002 | Foster et al. |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough |
| 6,463,535 B1 | 10/2002 | Drews |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Failk et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2004/0117539 A1 | 6/2004 | Bennett et al. |

FOREIGN PATENT DOCUMENTS

| | | |
|---|---|---|
| EP | 0 473 913 A2 | 3/1992 |
| EP | 0 535 863 A2 | 4/1993 |
| EP | 0 600 112 A1 | 6/1994 |
| EP | 0 602 867 A1 | 6/1994 |
| EP | 0 892 521 A2 | 1/1999 |
| EP | 0 930 567 A2 | 7/1999 |
| EP | 0 961 193 A2 | 12/1999 |
| EP | 0 965 902 A2 | 12/1999 |
| EP | 1 030 237 A1 | 8/2000 |
| EP | 1 055 989 A1 | 11/2000 |
| EP | 1 056 014 A1 | 11/2000 |
| EP | 1 085 396 A1 | 3/2001 |
| EP | 1 146 715 A1 | 10/2001 |
| EP | 1 209 563 A2 | 5/2002 |
| EP | 1 271 277 A2 | 1/2003 |
| JP | 2000-76139 | 3/2000 |
| WO | WO 95/24696 | 9/1995 |
| WO | WO 97/29567 | 8/1997 |
| WO | WO 98/12620 | 3/1998 |
| WO | WO 98/34365 | 8/1998 |
| WO | WO 98/44402 | 10/1998 |
| WO | WO 99/05600 | 2/1999 |
| WO | WO 99/09482 | 2/1999 |
| WO | WO 99/18511 | 4/1999 |
| WO | WO 99/57863 | 11/1999 |
| WO | WO 99/65579 | 12/1999 |
| WO | WO 00/21238 | 4/2000 |
| WO | WO 00/62232 | 10/2000 |
| WO | WO 01/27723 A1 | 4/2001 |
| WO | WO 01/27821 A2 | 4/2001 |
| WO | WO 01/63994 A2 | 8/2001 |
| WO | WO 01/75564 A2 | 10/2001 |
| WO | WO 01/75565 A2 | 10/2001 |
| WO | WO 01/75595 A2 | 10/2001 |
| WO | WO 02/01794 A2 | 1/2002 |
| WO | WO 02/17555 A2 | 2/2002 |
| WO | WO 02/060121 A1 | 8/2002 |
| WO | WO 02/086684 A2 | 10/2002 |
| WO | WO 03/058412 A2 | 7/2003 |

OTHER PUBLICATIONS

B. Schneier, "Basic Protocols," Applied Cryptography: Protocols, Algorithms, and Source Code in C, Oct. 1995, pp. 47-52, 2nd Edition, XP-002939871, John Wiley & Sons, New York, NY, USA.

B. Schneier, "Basic Protocols," Applied Cryptography: Protocols, Algorithms, and Source Code in C, Oct. 1995, pp. 56-65, 2nd Edition, XP-002138607, John Wiley & Sons, New York, NY, USA.

B. Schneier, "Key Management," Applied Cryptography: Protocols, Algorithms, and Source Code in C, Oct. 1995, pp. 169-187, 2nd Edition, XP-002111449, John Wiley & Sons, New York, NY, USA.

Menezes et al., "Handbook of Applied Cryptography," Handbook of Applied Cryptography, CRC Press Series on Discrete Mathematics and its Applications, pp. 403-405, 506-515 and 570, XP-022165287, CRC Press, Boca Raton, FL, USA.

Berg, How Do I Create a Signed Applet?, Dr. Dobb's Journal, Aug. 1997, pp. 1-9.

Brands, "Restrictive Blinding of Secret Key Certificates", (SP-002201306), 1995, pp. 1-35, Netherlands.

Chien, "Safe and Protected Execution for the Morph/AMRM Reconfigurable Processor", IEEE Apr. 1, 1999, pp. 209-221, USA.

"Trusted Computing Platform Alliance (TCPA): Main Specification Version 1.1a", 2000-2001, pp. 1-321, USA.

Courlouris, et al., Distributed Systems: Concepts and Designs: 14.4: Concurrency Control in Distributed Transaction, 1994, pp. 422-424, 2nd ed., Addison-Wesley Pub. Co.

Crawford, "Architecture of the Intel 80386", IEEE International Conference on Computer Design, VLSI in Computers, Oct. 6-9, 1986, pp. 155-160, New York, USA.

Davida, et al., "Defending Systems Against Viruses through Cryptographic Authentication", IEEE 1989, pp. 312-318, Wisconsin, USA.

Fabry, "Capability-Based Addressing", Communications of the ACM, Jul. 1974, pp. 403-412, vol. 17, No. 7, USA.

Frieder, "The Architecture and Operation Characteristics of the VMX Host Machine", IEEE 1982, pp. 9-16, USA.

Goldberg, "Survey of Virtual Machine Research", Computer, Jun. 1974, pp. 4-15, vol. 7, No. 6, USA.

Gong, "Going Beyond the Sandbox: An Overview of the New Security Architecture in the Java Development Kit 1.2", USENIX Symposium on Internet technologies and Systems, Dec. 1997, California, USA.

Gum, "System/370 Extended Architecture: Facilities for Virtual Machines", IBM J. Res. Develop., vol. 27, No. 6, pp. 530-543, Nov. 1983.

Heinrich, MIPS R4000 Microprocessor User's Manual, Chapter 4: "Memory Management" XP-002184449, MIPS Technology, 1994, pp. 61-97, California, USA.

Hewlett-Packard Co., "Mobile Security Overview", Sep. 2002, pp. 1-9, USA.

IBM Corporation, Information Display Technique for a Resident Program Technical Disclosure Bulletin, Dec. 1991, vol. 34, No. 7A, USA.

IBM Corporation, "IBM ThinkPad T30 Notebooks", Apr. 2002, pp. 1-6.

Intel Corporation, "Intel 386 DX Microprocessor 32-Bit CHMOS Microprocessor with Integrated Memory Management", Dec. 1995, pp. 2-56.

Intel Corporation, IA-32 Intel Architecture Software Developer's Manual: vol. 3: System Programming Guide.

Intel Corportion, "Intel 82082AB/82802AC Firmware Hub (FWH)", Nov. 2000, pp. 1-28, XP-002257561, USA.

IA-64 System Abstract Layer Specification, Jan. 2000, pp. 1-1 to 3-21, XP-002253057, USA.

Karger et al., "A VMM Security Kernel for the VAX Architecture", IEEE 1990, pp. 2-19, Boxborough, USA.

Kashiwagi, et al., "Design and Implementation of Dynamically Reconstructing System Software", IEEE 1996, pp. 278-287, Ohio, USA.

Lawton, "Running multiple operting systems concurrently on an IA32 PC using virtualization techniques", Nov. 29, 1999, pp. 1-31, http://www.plex86.org/research/paper.txt.

Luke et al., "Replacement Strategy for Aging Avionics Computers", IEEE AES Systems Magazine, Mar. 1999, XP-002190614, pp. 7-10, AFRL, Wright-Patterson AFB, OH, USA.

Menezes et al., "Signatures with additional functionality", XP-002201307, p. 475, PD 00-00-1997.

Motorola, "M68040 User's Manual", Motorola, Inc., 1990.

NANBA, et al., "VM/4: ACOS-4 Virtual Machine Architecture", IEEE, 1985, pp. 171-178.

Richt et al., "In-Circuit-Emulator wird echtzeittauglich", Elektronik, Aug. 1991, No. 16, pp. 100-103, Muchen, Germany.

Robin et al., "Analysis of the Intel Pentium's Ability to Support a Secure Virtual Machine Monitor", USENIX Assoc. 2000, pp. 1-17, Colorado, USA.

Rosenblum, "Vmware's Virtual Platform", Proceedings of Hot Chips 11, Aug. 11-17, 1999, pp. 185-196, USA.

"Software Authenticators", http://ww.rsasecurity.com/node.asp?id-1.31.3, 2004.

RSA Security, "RSA SecurID Authenticators: The gold standard in two-factor user authentication", 2003, pp. 1-2.

Saez et al., "A Hardware Scheduler for Complex Real-Time Systems", XP-002190615, IEEE 1999, pp. 43-48, Spain.

Sherwood et al., Patchable Instruction ROM Architecture: Cases '01, Nov. 17-17, 2001, (XP-002254429), pp. 24-33, Georgia, USA.

"Trusted Computing Platform Alliance (TCPA): Main Specification Version 1.0", Jan. 25, 2001, pp. 122-227, (XP-002272822), USA.

Schneier, Challenge-Response Identification (strong authentication), pp. 403-405, 506-515, 570, (XP-002165287), 1997.

PCT Written Opinion dated Sep. 2, 2005.

* cited by examiner

METHOD OF CONFIRMING A SECURE KEY EXCHANGE

BACKGROUND

1. Field

The present invention relates generally to computer security and, more specifically, to establishing a shared encryption key between system components.

2. Description

A computer system, such as a personal computer (PC), workstation, server, mainframe computer and so on, may comprise a number of different components. Some of the system components may be peripherals used by the system to communicate with a user or another system. For example, keyboards and mice are commonly used by the user to input data into the system. A display may be used to display information to the user. A network interface device may be used to connect the computer system to other computer systems or devices over a network.

Some system components may be coupled to other components using protocols known as "plug and play" protocols. For example, by using a Universal Serial Bus (USB), a system may allow multiple peripheral devices to be connected to the system. When a new peripheral is connected to the system, the system detects and identifies the newly added system component. Such a scheme typically relies on at least one host controller device (known as a USB host controller for systems using the USB) to control and monitor access to the system by the connected peripherals.

In some cases, it may be desired for various system components to securely communicate with each other. This may be accomplished in some systems by using well-known cryptographic methods. However, difficulties may arise when exchanging cryptographic keys between system components prior to engaging in secure communications. Generally, the actions of exchanging keys may be susceptible to a "man in the middle" attack. That is, an attacker may interpose an unauthorized component or program in between two communicating components to intercept one or more of the exchanged keys. The attacker may also possibly substitute other information in the communication stream between the components.

In systems using a USB host controller, an attacker could gain control of the USB host controller during a "man in the middle" attack and defeat secure communications between a peripheral and a processor in the system.

In a certificate-based key exchange protocol, each party receives a certificate of the public key of the other party. Each party then verifies the certificate of the other party. Using this protocol in the present situation for system components would require that each peripheral (or other system component) have a unique public/private key pair stored thereon. This would increase manufacturing costs of the peripheral. In addition, to ensure that the certificate has not been revoked, the computer system would need to be "on-line" and communicatively coupled to another networked computer storing the certificate revocation information at the time of the protocol use. This may present usability problems.

In a thumbprint-based key exchange protocol, each party generates a public/private key pair and exchanges a hash of the public keys over a secured channel (e.g., an "out of band" channel). In the present situation, there is no mechanism when using this protocol for the peripheral to send the hash of its public key to the processor. If the processor were to cause the display of the complete hash of its public key, the user could enter it using the peripheral (such as a keyboard), but this would take at least 27 random keystrokes (when using the well-known hash algorithm known as Secure Hash Algorithm (SHA-1)). In addition, there would be no means for the processor to know that the peripheral had received the correct public key (and not an illegitimate public key inserted by the "man in the middle" attacker). Thus, if there were such an attack, the peripheral would know that the hash entered by the user did not match the hash of the public key received by the peripheral from the processor, but the processor would not know this. The traditional way to solve this problem is for the second party (the peripheral) to generate a public key, send it to the first party (the processor), and then have the two parties compare their hashes. This doesn't work in this case since the peripheral does not have a way to display the peripheral's hash.

Accordingly, a better method of exchanging keys between system components is needed.

BRIEF DESCRIPTION OF THE DRAWINGS

The features and advantages of the present invention will become apparent from the following detailed description of the present invention in which.

DETAILED DESCRIPTION

An embodiment of the present invention is a key exchange protocol that can be performed between components of a system, such as between a computer program being executed by the processor of a PC (or other computer system) and a peripheral. In embodiments of the present invention, a peripheral with a user input capability and a very limited display capability, such as a keyboard or a mouse, may be used to confirm a key exchange between the system components in a way that requires the user to enter only small amounts of input data (e.g., keystrokes or mouse clicks). With the present invention, security between components may be enhanced without having a negative impact on usability of the system. Embodiments of the present invention do not require any uniqueness of the peripheral, the user need enter only a few inputs, and if the peripheral does not receive the correct public key of the other component (such as the processor) during the key exchange protocol, the processor can detect this situation. Embodiments of the present invention help to deter "man in the middle" attacks wherein an attacker gains control of a system component situated between certain communicating system components.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
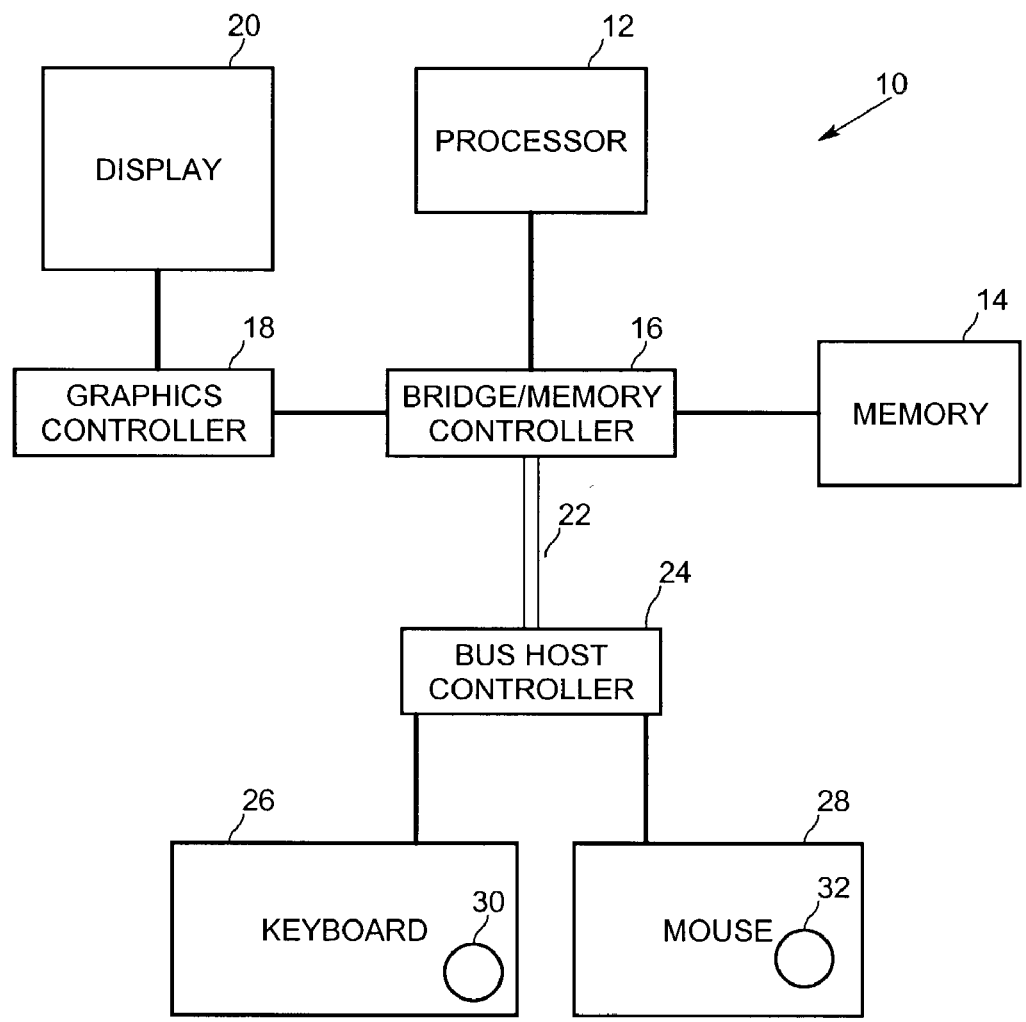
FIG. 1 is a diagram of a system according to an embodiment of the present invention.

FIG. 1 is a high level diagram of a system according to an embodiment of the present invention. System 10 includes various well-known components such as processor 12 and memory 14. Other components are not shown in FIG. 1 for purposes of clarity. Processor 12 and memory 14 may be communicatively coupled using a bridge/memory controller 16. The bridge/memory controller may be coupled to a graphics controller 18. The graphics controller controls the output of display data on display 20. In one embodiment, communication between the processor, the graphics controller and the display comprise a trusted channel, such that an adversary or attacker cannot read or modify the data displayed on the display. Bridge/memory controller 16 may be coupled to one or more buses represented as line 22. One device communicatively coupled to the one or more buses may be bus host controller 24. When one of the buses is a Universal Serial Bus (USB), the bus host controller may be a USB host controller.

When using a USB, a plurality of devices may be coupled to the bus. For example, user input devices such as keyboard 26 and mouse 28 may be included in the system for providing input data. Although a keyboard and mouse are shown in FIG. 1, it is contemplated that the present invention may be also applied to the use of other peripherals. In embodiments of the present invention, an input device being used to securely communicate with other system components includes at least one trust indicator. For example, keyboard 26 may include at least one trust indicator 30, and mouse 28 may include at least one trust indicator 32. In one embodiment, the at least one trust indicator comprises a plurality of colored light emitting diodes (LEDs). In one embodiment, an LED having three distinct colors (such as amber, green, and red) may be used to represent three different states. The operational meaning of illuminating the different colors and the states will be explained below. In other embodiments, other methods of indicating a current state of the peripheral may be used in place of a colored LED, such as multiple audible tones, symbols on a liquid crystal display (LCD), or other perceptible indicators.

In embodiments of the present invention, peripherals (e.g., keyboard and/or mouse) need not be manufactured with a unique key or value preset. However, a peripheral according to embodiments of the present invention must include capabilities for asymmetric cryptography, symmetric cryptography, and a hash function. A peripheral that has a random number generator and non-volatile storage enhances the user experience, but are not necessary.

In the system described at a high level in FIG. 1, it may be desired that communications between a program being executed by the processor and a peripheral such as keyboard 26 be secure. One mechanism for securing such communication is by using known symmetric cryptographic methods to encrypt and decrypt data communicated between the components. Prior to beginning such a communication, a symmetric key must be exchanged between the components. As shown in FIG. 1, the communications path between the peripheral and the processor includes the bus host controller. However, an attacker may gain control of the bus host controller as part of a "man in the middle" attack, and may then be able to read and/or modify bus traffic. The attacker could read the symmetric key during transmission on the bus and decrypt subsequent traffic over the bus.

Asymmetric public key cryptography may be used to protect the symmetric key during the exchange. A first component may encrypt a symmetric key using the second component's public key and send the encrypted symmetric key to the second component. The second component can then decrypt the encrypted symmetric key using the second component's private key. In order to use asymmetric keys in this way to defeat a possible attack on transmission of the symmetric key, initially the public key of the second component (e.g., processor) must be securely transmitted to the first component (e.g. peripheral). If the public key is transmitted on this communications path using typical methods, the attacker may intercept and replace the public key with an illegitimate public key, without being detected. To deter such activity, the key exchange protocol of embodiments of the present invention may be used to initially set up secure communications between the components.

Figure 2:
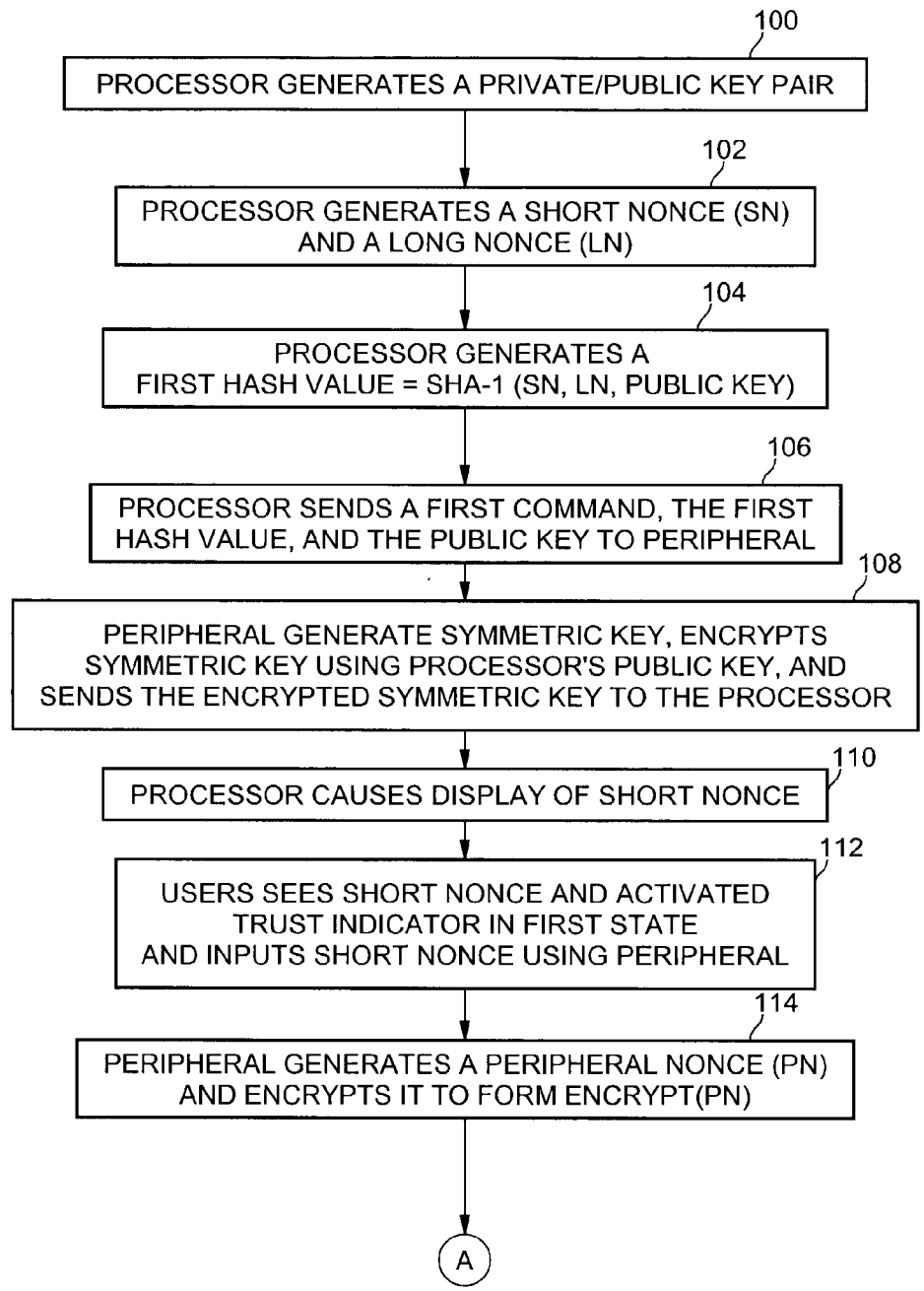
FIGS. 2 and 3 are flow diagrams illustrating establishing a shared encryption key between system components according to an embodiment of the present invention.
Figure 3:
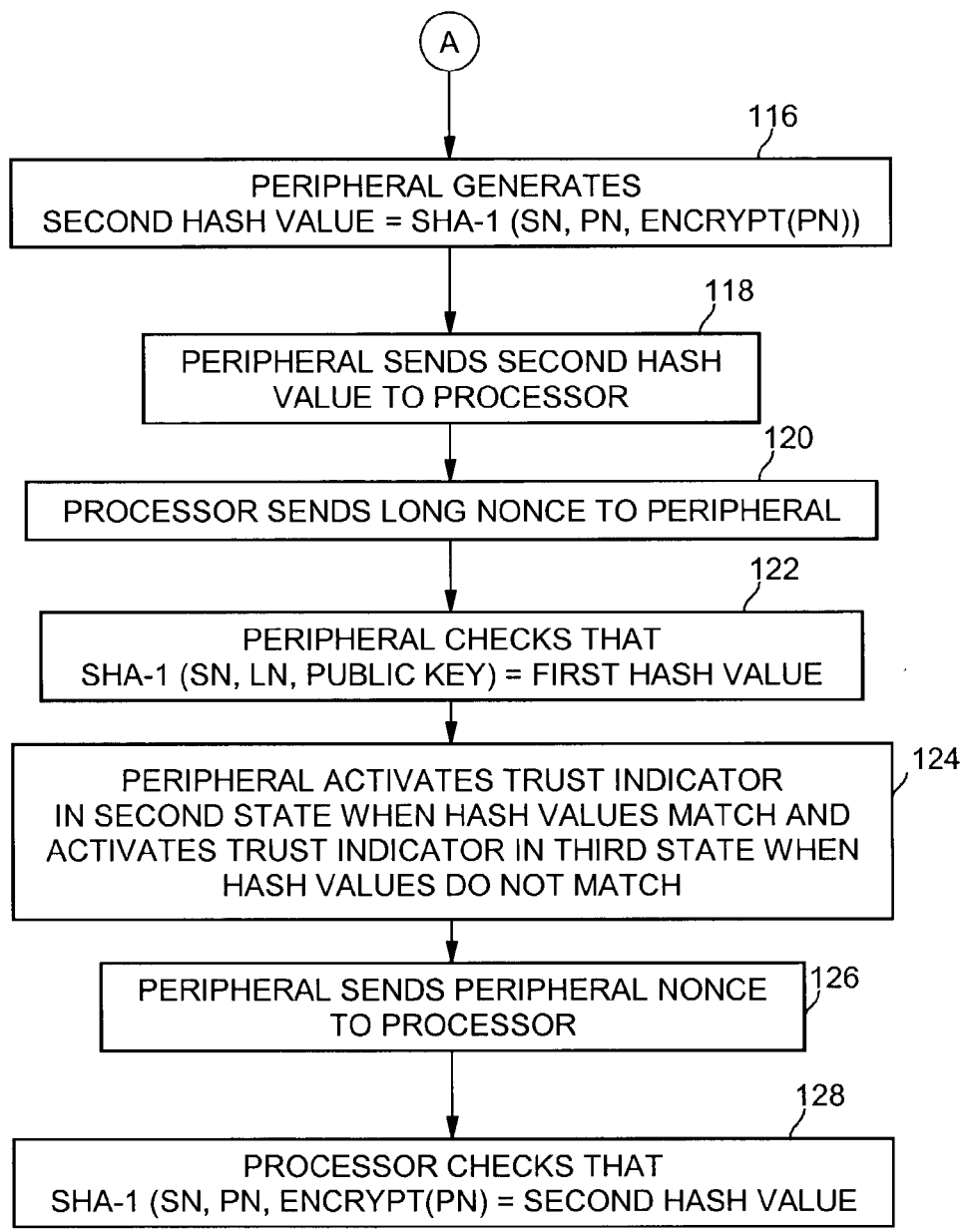

FIGS. 2 and 3 are flow diagrams illustrating establishing a shared encryption key between system components according to an embodiment of the present invention. In the embodiment shown, communications between a processor 12 and a peripheral (such as a keyboard 26 or a mouse 28, for example) are discussed, although the present method may be applied to communications between other system components. At block 100, the processor generates a private/public key pair according to known techniques of asymmetric cryptography. Note that the actions attributed to the processor herein may be implemented by a computer program executed by the processor. Furthermore, the actions attributed to the peripheral may be implemented by any combination of circuitry, firmware, and/or software resident in the peripheral. The processor stores the key pair in memory for later use. At block 102, the processor generates a short nonce (SN) and a long nonce (LN). A nonce may be a sequence of bits randomly generated by a random number generator. In one embodiment, the short nonce may comprise four or more characters, each character including at least six bits. When the peripheral is a keyboard, each character may represent any of the keys on the keyboard. In other embodiments, other numbers of bits may be used for the short nonce. In one embodiment, the long nonce may comprise randomly generated 160 bits. In other embodiments, other numbers of randomly generated bits may be used for the long nonce. At block 104, the processor generates a first hash value by applying a hash algorithm using the short nonce, the long nonce, and the public key generated in block 100 as input parameters. In one embodiment, the SHA-1 hash algorithm may be employed, although in other embodiments other hash algorithms may be used (e.g., MD5, and so on).

At block 106, the processor sends a first command, the first hash value and the processor's public key to the peripheral. This data may be sent to the peripheral in one or more separate transfers. It is assumed that an adversary could choose to prevent these data transfers from going to the peripheral, or to modify them. The remaining actions described herein generally assume that the data transfers occur (although they may be modified by the attacker). In one embodiment, this first command may be known as a "reset-learn" command. Receipt of this command by the peripheral (such as a keyboard 26 or mouse 28), puts the peripheral in a "learn" mode and activates one portion of the trust indicator 30 resident in the peripheral. The trust indicator acts as a perceptible sign to the system user that the peripheral is in "learn" mode.

In one embodiment, the trust indicator may be a colored LED. A selected color of the LED (such as an amber LED) may be illuminated to indicate to the user that the peripheral is now in a "learn" mode or state. In the "learn" mode, the peripheral performs the key exchange protocol described herein, and does not forward any input data entered by the user to the bus host controller 24 until the protocol is complete, except as noted in the remainder of the protocol. Note the peripheral includes software, firmware and/or circuitry to receive the first command, interpret the command, and activate the trust indicator for perception by the user.

At block 108, in response to receiving the "reset-learn" command, the peripheral generates a symmetric key (used as a session key for subsequent communications), encrypts the symmetric key using the processor's public key (received in block 106), and sends the encrypted symmetric key to the processor. Generation of the symmetric key may require a random number generator in the peripheral. During this block, there may be an attacker operating as a "man in the middle" by controlling the bus host controller. It is assumed that the attacker could choose to prevent the data transfer of the encrypted symmetric key to the processor, or to modify it. The remaining actions assume that the data transfer occurs (although it could be modified). In one embodiment, the symmetric key may be an Advanced Encryption Standard (AES) key having 128 bits, although other symmetric keys of different types and lengths may also be used.

At block 110, once the processor receives the encrypted symmetric key, the processor 12 causes the display of the short nonce, and possibly instructions, on the display 20 using some form of trusted output. At block 112, the user sees the display of the short nonce and the activated trust indicator. For example, the text on the display may instruct the user on the meaning of the activated trust indicator and what to do with the displayed short nonce. At this point the trust indicator still indicates the "learn" mode or state for the peripheral. Based on the display of the short nonce and the activated trust indicator, the user inputs the short nonce using the peripheral. For example, the user may notice the amber LED is illuminated and follow instructions on the display to input the short nonce. When the peripheral is a keyboard, the user types the short nonce. When the peripheral is a mouse, the user may follow directions to manipulate the mouse to point to certain areas of the display screen and/or depress one or more of the mouse buttons in a sequence corresponding to the short nonce. One skilled in the art will realize that other input mechanisms may also be used. Since the peripheral is in "learn" mode, the peripheral does not forward the user's input data to the bus host controller.

At block 114, the peripheral generates a peripheral nonce (PN) and encrypts the peripheral nonce with the symmetric key to form Encrypt(PN). The peripheral nonce may be any randomly generated value. This may be accomplished by a random number generator in the peripheral, or it may be accomplished by asking the user to enter random keystrokes (when the peripheral is a keyboard) for a short period of time. For a mouse, the random number could be generated by asking the user to move the mouse for a while and capturing input data related to the mouse movement. Processing continues via connector A at block 116 on FIG. 3. At block 116, the peripheral generates a second hash value by applying a hash algorithm using the short nonce (received from the user at block 112), the peripheral nonce, and Encrypt(PN) as input parameters. In one embodiment, the SHA-1 hash algorithm may be used. At block 118, the peripheral sends the second hash value to the processor. Note that in an effort to defeat this scheme, an attacker (e.g., the "man in the middle") would have to commit to the second hash value before it sees the short nonce.

Next, at block 120, the processor sends the long nonce to the peripheral after receiving the second hash value. In various embodiments, implementation of blocks 114 and 120 may be performed in the order shown or the opposite order. At this point, the peripheral has received the long nonce and the processor's public key from the processor, and the short nonce from the user. At block 122, the peripheral checks that the hash of the short nonce, long nonce, and the processor's public key matches the first hash value sent to the peripheral by the processor (at block 106). The same hash algorithms must be used. For example, if the SHA-1 hash algorithm was used at block 104, then the SHA-1 algorithm must be used at block 122.

If the first hash value received from the processor equals the hash value computed by the peripheral, then the peripheral is assured that the peripheral actually received the processor's legitimate public key. When the hash values match, the peripheral activates the trust indicator to indicate a second mode or state (e.g., an "OK" state) at block 124. For example, the peripheral may illuminate a green LED, indicating to the user that processing is proceeding in an authorized manner and that input from the device can be trusted. If the hash values do not match, then the peripheral knows that it did not receive the authentic public key from the processor. The peripheral may then activate the trust indicator to indicate a third mode or state (e.g., an error state) at block 124. For example, the peripheral may illuminate a red LED, indicating to the user that some unauthorized activity has taken place and that communications between system components are not secure. In another embodiment wherein only two colors of LEDs are used, the amber light may be made to blink when an error is detected. Error handling operations may then be initiated in the system.

At this point, the peripheral knows whether it has received the authentic public key from the processor, but the processor does not know if the peripheral received the correct key or not. Thus, at block 126 the peripheral sends the peripheral nonce generated at block 114 to the processor. At block 128, the processor computes the hash value of the short nonce generated at block 102, the peripheral nonce received from the peripheral at block 126, and Encrypt(PN) (created by the processor by encrypting the peripheral nonce with the symmetric key, the symmetric key being available to the processor by decrypting the encrypted symmetric key received at block 108 using the processor's private key). If the SHA-1 hash algorithm was used in block 116, then the processor uses the SHA-1 algorithm in block 128. The processor compares the computed hash value to the second hash value received from the peripheral at block 118. If the hash values match, then the processor knows that the peripheral received the processor's public key and that further secure communications are enabled. In one embodiment, the processor may display a key exchange complete message on the display to inform the user that secure communications are now enabled. If the hash values do not match, error processing may be initiated and/or secure communications are disabled. For example, the processor may refuse to accept any trusted input data from the peripheral. In addition, a warning message may be output to the display informing the user that input from the peripheral cannot be trusted.

If the peripheral includes a non-volatile memory, the above method needs to be performed only once, and then the symmetric key may be permanently stored in the peripheral and in memory accessible to the processor. In one embodiment, the symmetric key may be used to encrypt and decrypt subsequent communications between system components. In another embodiment, the symmetric key may be used to encrypt new session keys that are then used for actual encrypted communications between the peripheral and the processor. After a session key has been generated, the peripheral could create a private/public key pair, encrypt the public key and a machine authentication code (MAC) with the symmetric key, and send the encrypted public key and MAC to the processor. Then, if the peripheral includes a non-volatile memory, the peripheral's private key may be stored permanently in the peripheral, and the public key of the peripheral may be stored in memory accessible to the processor.

Although a particular sequence of actions has been described herein, in various embodiments different actions may be performed in different sequences to achieve the same result.

In other embodiments, various changes may be made to the above protocol. For example, the actions at block 104 and the checking in block 122 may be replaced with a new block after block 108, in which the processor generates a hash value of the short nonce, the long nonce, and an encryption of the long nonce using the received symmetric key, and the check in block 122 would be a check on this revised hash value. In this embodiment, the checks performed by the processor and the peripheral may be the same.

A complication may ensue when the peripheral is a mouse. Because the short nonce generated by the processor and the nonce entered by the user using a mouse may not be exactly the same, since the mouse was clicked within a button, and not an exact location, the processor may send its version of the short nonce along with the long nonce at block 120, and the mouse may send its version of the short nonce to the processor at block 126, and each will check that they are close.

Assuming the hash algorithm used is trustworthy, the best approach the attacker can make in attacking the present method is to try to guess the short nonce. When using the SHA-1 hash algorithm, the chance of defeating the present method is 1 in $2^{(6*v)}$, where v is the number of characters in the short nonce and assuming that there are six bits per character. Hence, the chance of defeating the present method when only four characters are used in the short nonce is one in 16 million. Using four characters as the short nonce provides good security for the present invention, yet is a sufficiently small number of characters to require the user to enter into the system so as to have a negligible effect on usability.

Figure 4:
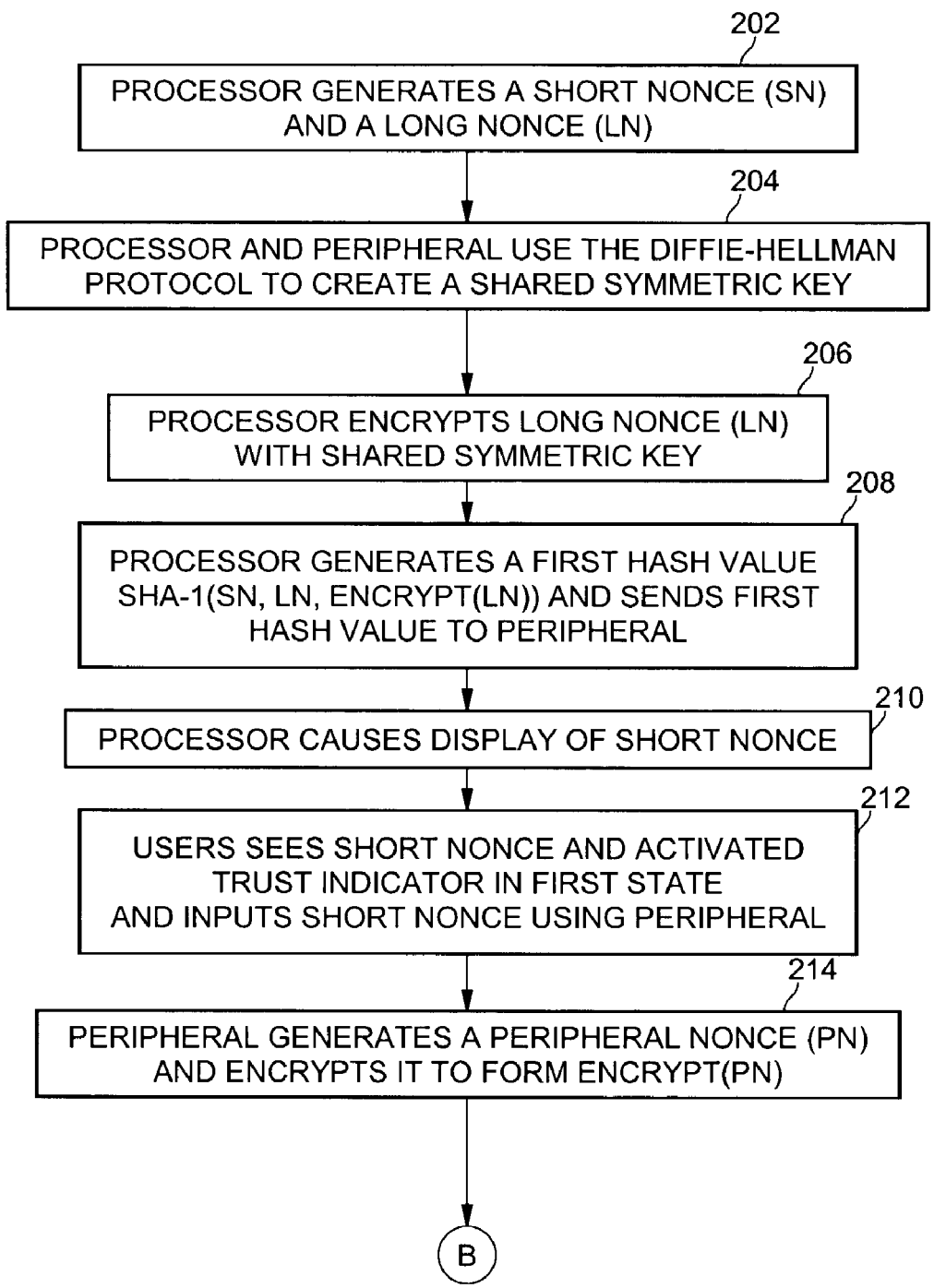
FIGS. 4 and 5 are flow diagrams illustrating establishing a shared encryption key between system components according to another embodiment of the present invention.
Figure 5:
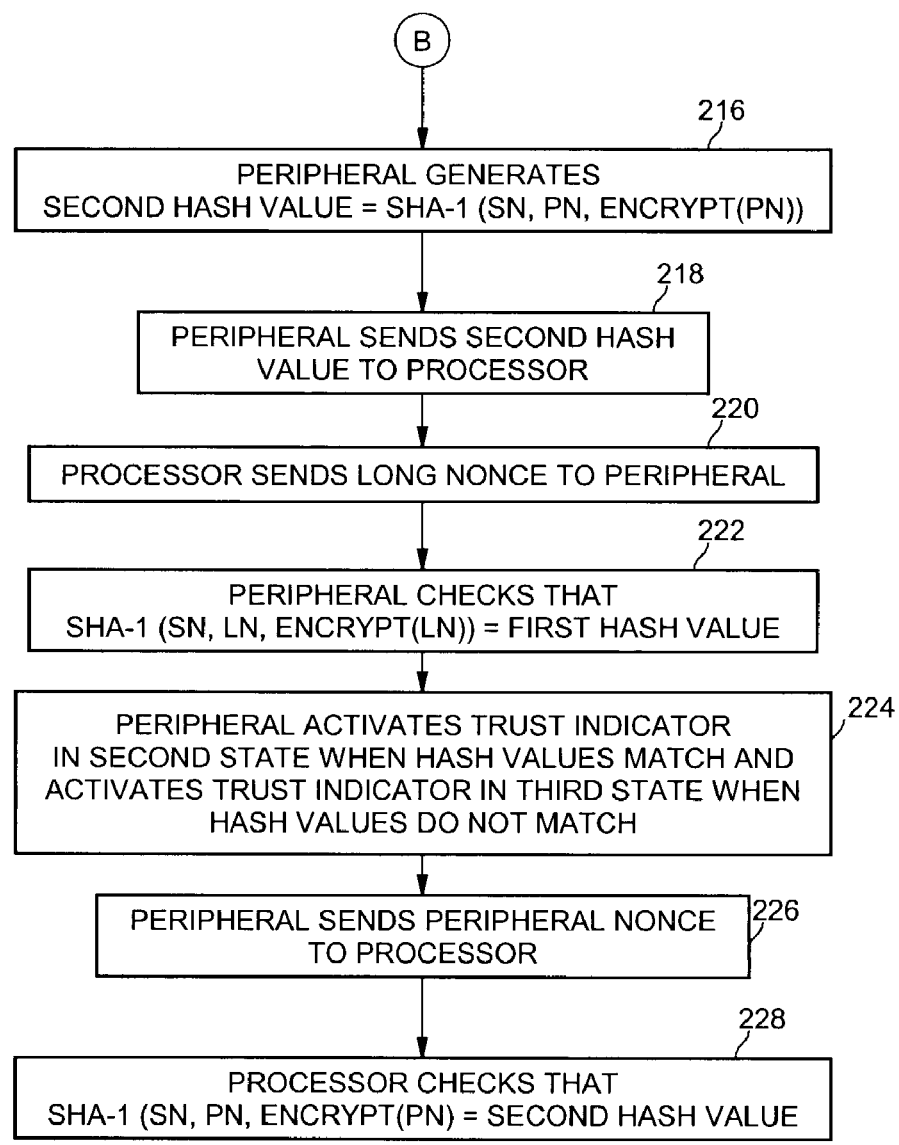

In another embodiment, the method of exchanging the symmetric key may be according to the well-known Diffie-Hellman method. With the Diffie-Hellman method, the symmetric key is created from messages sent during the protocol. After the Diffie-Hellman method is used to create a shared symmetric key, the processor and the peripheral would confirm that they have the same symmetric key. FIGS. 4 and 5 illustrate this embodiment.

In a protocol shown in FIG. 4, at block 208 the processor forms a commitment to the value of the short nonce, the long nonce, and the shared symmetric key in that after the peripheral has received the hashed value, the processor cannot change these values, so that the processor has "committed" to these values. The processor opens the commitment by disclosing the secret information in the commitment to the peripheral. Because the peripheral already had the shared symmetric key, the peripheral just needs to obtain the value of the short nonce and the long nonce. Part of this step is done through a secure method that cannot be observed by any adversary. This is done at blocks 210 and 212. The long nonce is revealed at block 220. This gives the peripheral confidence that the processor has the same symmetric key. Conversely, the peripheral can commit to a value before the processor has completely opened the processor's value. This is done at blocks 214, 216, 218. The peripheral then opens this commitment, as seen in block 226. This gives the processor confidence that the peripheral has the same symmetric key.

Figure 6:
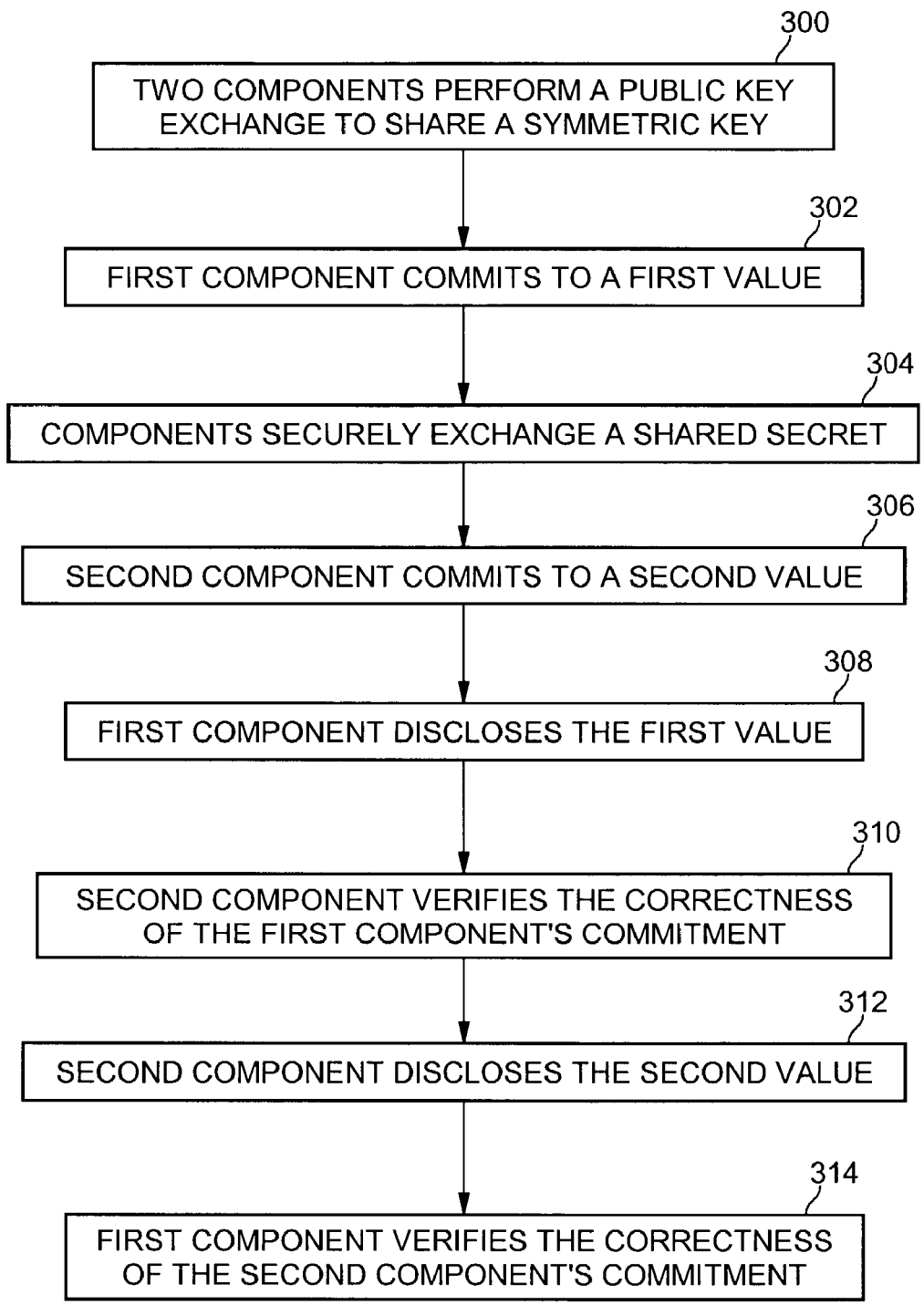
FIG. 6 is a flow diagram of another embodiment of the present invention.

One embodiment of this more general protocol is described in FIG. 6. At block 300, the first component and second component exchange a shared secret (e.g., a symmetric key), through a process such as the Diffie-Hellman key exchange or using a public key cryptographic algorithm. At block 302, the first component commits to a first value to the second component, such as the mechanism described in blocks 202, 206, and 208. At block 304, the components securely exchange a shared secret, such as through the mechanism at block 204. At block 308, the first component discloses the first value, such as through the mechanisms in blocks 210, 212, and 220. At block 310, the second component verifies the correctness of the first component's commitment, such as through the mechanism in block 222. This embodiment may also include the converse commitment and disclose of the second component. In block 306, the second component commits to a second value, such as through the mechanism used in blocks 214, 216, and 218. Note, if this converse commitment is used, it is important for the second commitment to occur before the first component has revealed its commitment. In block 312 the second component discloses this second value, such as through the mechanism used in block 226. At block 314, the first component verifies the correctness of the commitment and disclosure of the commitment, such as through the mechanism described at block 228.

As described above, embodiments of the present invention establish a shared encryption key between a processor and a peripheral even in the case where there is an attacker in control of the bus host controller. The key exchange protocol has an advantage in that it does not require any uniqueness on the peripheral, the user need only enter a few input choices (e.g., keystrokes), and if the peripheral does not receive the correct public key of the processor, the processor will know that outcome.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, handheld computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of securely exchanging a symmetric key between first and second components of a system comprising:
   generating, by the first component, an asymmetric key pair, a first nonce, a second nonce, and a first hash value of the first nonce, the second nonce, and a public key of the first component's asymmetric key pair;
   sending, by the first component, a first command, the first hash value, and the first component's public key to the second component; and
   generating, by the second component, the symmetric key, encrypting the symmetric key using the first component's public key, and sending the encrypted symmetric key to the first component, in response to receiving the first command.

2. The method of claim 1, further comprising:
   causing display of the first nonce by the first component;
   accepting, by the second component, input of the displayed first nonce; and
   generating, by the second component, a third nonce, encrypting the third nonce with the symmetric key, generating a second hash value of the first nonce, the third nonce, and the encrypted third nonce, and sending the second hash value to the first component.

3. The method of claim 2, further comprising:
   sending, by the first component, the second nonce to the second component;
   checking, by the second component, that the hash value of the first nonce, the second nonce, and the first component's public key matches the first hash value;
   activating, by the second component, a second trust indicator when the hash values match; and
   activating, by the second component, a third trust indicator when the hash values do not match.

4. The method of claim 3, further comprising:
   sending, by the second component, the third nonce to the first component; and
   checking, by the first component, that the hash value of the first nonce, the third nonce, and the encrypted third nonce matches the second hash value.

5. The method of claim 1, wherein the second component comprises a keyboard and the first nonce comprises a randomly generated first number of characters representing keys on the keyboard.

6. The method of claim 1, wherein the second nonce comprises a predetermined number of randomly generated bits.

7. The method of claim 1, wherein the first command comprises a "reset-learn" command to put the second component into a "learn" mode, whereby input data received by the second component is not forwarded to the first component while the second component is in "learn" mode.

8. The method of claim 1, further comprising activating a first trust indicator on the second component after receiving the first command.

9. The method of claim 4, further comprising causing the display of a message indicating secure communications between the first and second components are enabled when the hash value of the first nonce, the third nonce, and the encrypted third nonce matches the second hash value.

10. The method of claim 4, further comprising causing the display of a message indicating secure communications between the first and second components are disabled when the hash value of the first nonce, the third nonce, and the encrypted third nonce does not match the second hash value.

11. An article comprising: a machine accessible medium having a plurality of machine readable instructions, wherein when the instructions are executed by a processor, the instructions provide for securely exchanging a symmetric key between first and second components of a system, the instructions including
   generating, by the first component, an asymmetric key pair, a first nonce, a second nonce, and a first hash value of the first nonce, the second nonce, and a public key of the first component's asymmetric key pair;
   sending, by the first component, a first command, the first hash value, and the first component's public key to the second component; and
   generating, by the second component, the symmetric key, encrypting the symmetric key using the first component's public key, and sending the encrypted symmetric key to the first component, in response to receiving the first command.

12. The article of claim 11, further comprising instructions for
   causing display of the first nonce by the first component;
   accepting, by the second component, input of the displayed first nonce; and
   generating, by the second component, a third nonce, encrypting the third nonce with the symmetric key, generating a second hash value of the first nonce, the third nonce, and the encrypted third nonce, and sending the second hash value to the first component.

13. The article of claim 12, further comprising instructions for
   sending, by the first component, the second nonce to the second component;

checking, by the second component, that the hash value of the first nonce, the second nonce, and the first component's public key matches the first hash value;

activating, by the second component, a second trust indicator when the hash values match; and activating, by the second component, a third trust indicator when the hash values do not match.

14. The article of claim 13, further comprising instructions for sending, by the second component, the third nonce to the first component; and checking, by the first component, that the hash value of the first nonce, the third nonce, and the encrypted third nonce matches the second hash value.

15. The article of claim 11, wherein the second component comprises a keyboard and the first nonce comprises a randomly generated first number of characters representing keys on the keyboard.

16. The article of claim 11, wherein the second nonce comprises a predetermined number of randomly generated bits.

17. The article of claim 11, wherein the first command comprises a "reset-learn" command to put the second component into a "learn" mode, whereby input data received by the second component is not forwarded to the first component while the second component is in "learn" mode.

18. The article of claim 11, further comprising instructions for activating a first trust indicator on the second component after receiving the first command.

19. The article of claim 14, further comprising instructions for causing the display of a message indicating secure communications between the first and second components are enabled when the hash value of the first nonce, the third nonce, and the encrypted third nonce matches the second hash value.

20. The article of claim 14, further comprising instructions for causing the display of a message indicating secure communications between the first and second components are disabled when the hash value of the first nonce, the third nonce, and the encrypted third nonce does not match the second hash value.

21. A system comprising:

a processor configured to generate an asymmetric key pair, a first nonce, a second nonce, and a first hash value of the first nonce, the second nonce, and a public key of the processor's asymmetric key pair, and to send a first command, the first hash value, and the processor's public key; and a peripheral coupled to the processor and configured to receive the first command, the first hash value, and the processor's public key, to generate a symmetric key, to encrypt the symmetric key using the processor's public key, and to send the encrypted symmetric key to the processor, in response to receiving the first command.

22. The system of claim 21, wherein the processor is further configured to cause the display of the first nonce by the processor, and the peripheral is further configured to accept input of the displayed first nonce, to generate a third nonce, to encrypt the third nonce with the symmetric key, to generate a second hash value of the first nonce, the third nonce, and the encrypted third nonce, and to send the second hash value to the processor.

23. The system of claim 22, wherein the processor is further configured to send the second nonce to the peripheral; and the peripheral comprises a second trust indicator and a third trust indicator and is further configured to check that the hash value of the first nonce, the second nonce, and the processor's public key matches the first hash value, to activate the second trust indicator when the hash values match; and to activate the third trust indicator when the hash values do not match.

24. The system of claim 23, wherein the peripheral is further configured to send the third nonce to the peripheral; and the processor is further configured to check that the hash value of the first nonce, the third nonce, and the encrypted third nonce matches the second hash value.

25. The system of claim 21, wherein the peripheral comprises a first trust indicator and is further configured to activate the first trust indicator after receiving the first command.

26. The system of claim 24, wherein the peripheral comprises a keyboard, and the trust indicators comprise colored light emitting diodes (LEDs).

27. The system of claim 24, wherein the peripheral comprises a keyboard, and the first nonce comprises a randomly generated first number of characters representing keys on the keyboard.

28. The system of claim 24, wherein the peripheral comprises a keyboard, and the trust indicators comprise audible tones.

29. The system of claim 24, wherein the peripheral further comprises a non-volatile memory to store the symmetric key.

* * * * *